United States Patent
Bowman et al.

(10) Patent No.: US 8,038,176 B2
(45) Date of Patent: Oct. 18, 2011

(54) SEAL WITH RIGID STOP RING

(75) Inventors: Matthew A. Bowman, Palmer, PA (US);
Scott Madara, Nazareth, PA (US);
Thomas M. Soloe, Nazareth, PA (US);
Charles E. Wilke, Jr., Northampton, PA (US)

(73) Assignee: Victaulic Company, Easton, PA (US)

(*) Notice: Subject to any disclaimer, the term of this patent is extended or adjusted under 35 U.S.C. 154(b) by 0 days.

(21) Appl. No.: 12/539,330

(22) Filed: Aug. 11, 2009

(65) Prior Publication Data

US 2011/0037250 A1    Feb. 17, 2011

(51) Int. Cl.
*F16L 17/00*    (2006.01)

(52) U.S. Cl. ........................... 285/112; 285/367

(58) Field of Classification Search .......... 285/110–112, 285/367, 411, 420; 277/611, 616, 607, 626, 277/627
See application file for complete search history.

(56) References Cited

U.S. PATENT DOCUMENTS

| 1,704,003 | A | | 3/1929 | Johnson |
| 3,291,506 | A | | 12/1966 | Blakeley |
| 3,680,894 | A | | 8/1972 | Young |
| 3,967,837 | A | * | 7/1976 | Westerlund et al. .......... 285/112 |
| 4,201,392 | A | * | 5/1980 | Watts |
| 4,230,157 | A | * | 10/1980 | Larsen et al. ................. 277/616 |
| 4,473,471 | A | * | 9/1984 | Robichaud et al. ........... 277/627 |
| 4,572,523 | A | * | 2/1986 | Guettouche et al. .......... 277/616 |
| 4,666,165 | A | * | 5/1987 | Nordin .......................... 277/616 |
| 4,779,903 | A | * | 10/1988 | Maier et al. ................... 277/627 |
| 4,838,582 | A | * | 6/1989 | Hatakeyama et al. ........ 285/110 |
| 6,547,255 | B1 | * | 4/2003 | Donaway et al. ............. 277/626 |
| 7,712,796 | B2 | | 5/2010 | Gibb et al. |
| 2005/0253380 | A1 | | 11/2005 | Gibb et al. |

FOREIGN PATENT DOCUMENTS

| GB | 2149037 | 6/1985 |
| GB | 2186651 | 8/1987 |

OTHER PUBLICATIONS

Victaulic Company, "Reducing Coupling Style 750", 1975.
Victaulic Company, "Reducing Coupling Style 750", 2007.
European Search Report dated Nov. 10, 2010 for 10171271.9-2424.

* cited by examiner

*Primary Examiner* — David E Bochna
(74) *Attorney, Agent, or Firm* — Ballard Spahr LLP

(57) ABSTRACT

A seal for pipe couplings and a method of connecting pipe elements. The seal has an elastic ring surrounding a rigid ring. The elastic ring has side portions connected by a recessed center portion. The recessed center portion has a diameter no greater than the final diameter of the elastic ring in its deformed shape which effects a fluid tight joint. The seal is positioned between segments of a pipe coupling. Pipe elements are inserted into the elastic ring against the rigid ring from opposite sides of the coupling. The segments are drawn toward one another by fasteners, compressing the side portions and effecting the fluid tight joint.

20 Claims, 5 Drawing Sheets

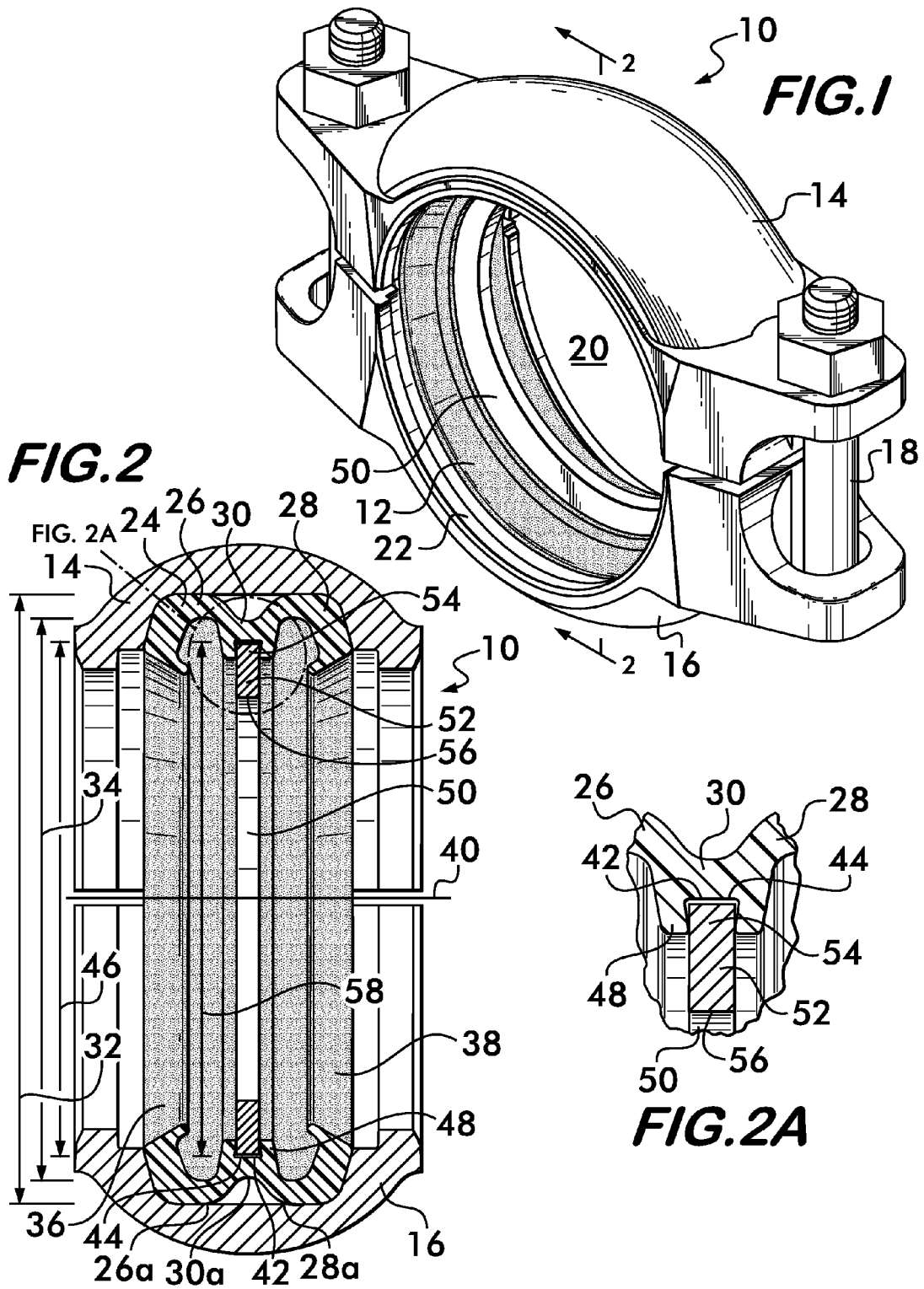

SEAL WITH RIGID STOP RING

FIELD OF THE INVENTION

This invention relates to seals used with couplings to connect pipe elements in end to end relation, and especially to installation ready couplings which do not need to be disassembled to receive pipe elements.

BACKGROUND

Mechanical couplings for joining pipe elements together end-to-end comprise interconnectable segments that are positionable circumferentially surrounding the end portions of pipe elements. The term "pipe element" is used herein to describe any pipe-like item or component having a pipe like form. Pipe elements include pipe stock, pipe fittings such as elbows, caps and tees as well as fluid control components such as valves, reducers, strainers, restrictors, pressure regulators and the like.

Each mechanical coupling segment comprises a housing having arcuate surfaces which project radially inwardly from the housing and engage plain end pipe elements, shoulder end pipe elements, or circumferential grooves that extend around each of the pipe elements to be joined. Engagement between the arcuate surfaces and the pipe elements provides mechanical restraint to the joint and ensures that the pipe elements remain coupled even under high internal pressure and external forces. The housings define an annular channel that receives a gasket or seal, typically an elastomeric ring which engages the ends of each pipe element and cooperates with the segments to provide a fluid tight joint. The segments have connection members, typically in the form of lugs which project outwardly from the housings. The lugs are adapted to receive fasteners, such as nuts and bolts, which are adjustably tightenable to draw the segments toward one another.

For installation ready couplings of the type disclosed in U.S. Pat. No. 7,086,131 to Gibb et al., the coupling segments are preassembled at the factory, i.e., bolted together, but supported on the seal in spaced apart relation, one of the features which allow the pipe elements to be inserted into the coupling without first disassembling it. To facilitate positioning of the pipe elements within the coupling so that their arcuate surfaces align with circumferential grooves in the pipe elements the seal will have a stop comprising a circumferential ring. The stop ring is positioned concentric with the seal between the sealing surfaces which engage the pipe elements. The stop ring projects radially inwardly toward the center of the seal. Pipe elements are inserted into the seal between the segments until they contact the stop ring. The bolts holding the segments together are then tightened, drawing the segments toward one another to compress the seal against the pipe elements and engage the arcuate surfaces with the grooves to effect a fluid tight mechanical joint.

Typically, the stop ring is made of the same flexible, resilient material as the seal. One disadvantage to such a construction is that a stop ring made of a soft, flexible material such as an elastomer can be damaged when pinched between the ends of the pipe elements, for example, during a bending test of the pipe joint or a major seismic event, where the pipe elements held by the coupling are substantially angularly displaced relative to the coupling. The pinched portion of the stop may become deformed, which is considered unacceptable for some applications. There is clearly a need for a stop ring which does not suffer the disadvantages described above to promote safety in critical fire protection systems while allowing for the economic advantages permitted by the use of installation ready couplings.

SUMMARY

The invention concerns a seal for a pipe coupling having a plurality of segments attached in end to end relation surrounding a central space. The seal is positionable within the central space and comprises a first ring formed of a flexible, resilient material. The first ring has first and second oppositely disposed side portions which extend circumferentially and may be coaxially aligned. A center portion is positioned between and connects the side portions to one another. Each of the side portions has an outer diameter greater than the outer diameter of the center portion. A circumferential groove is positioned within the center portion and faces radially inwardly. A second ring has an outer portion positioned within the circumferential groove and an inner portion which projects radially inwardly.

In one embodiment, the circumferential groove has a trapezoidal cross sectional shape. The second ring may have a rectangular cross sectional shape. The circumferential groove has a radially facing surface which defines an inner diameter. The second ring may have an outer diameter equal to or less than the inner diameter of the circumferential groove.

The first ring is formed of an elastic material such as EPDM, nitrile, perfluoroelastomers and silicone. The second ring is formed of a rigid material, such as metal.

The seal may also be described as comprising a first ring formed of a flexible, resilient material. The first ring has first and second surface portions facing radially outwardly for engagement with inner surfaces of the segments comprising the pipe coupling. The seal also has a third outwardly facing surface portion positioned between the first and the second surface portions. The third surface portion is recessed radially inwardly relative to the first and second surface portions. A circumferential groove is positioned opposite to the third surface portion and faces radially inwardly. A second ring, formed of a rigid material, has an outer portion captured within the groove. The second ring also has an inner portion which projects radially inwardly.

The invention also encompasses a coupling for connecting pipe elements in end to end relation. The coupling comprises a plurality of segments attached to one another in end to end relation surrounding a central space. The segments are positioned in spaced apart relation relatively to one another. A seal is positioned within the central space. The seal comprises a first ring formed of a flexible, resilient material. The first ring has first and second oppositely disposed coaxial side portions extending circumferentially, and a coaxial center portion positioned between and connecting the side portions to one another. Each of the side portions has an outer diameter sized to support the segments in the spaced apart relation. The center portion has an outer diameter smaller than the outer diameters of the side portions. A circumferential groove is positioned within the center portion and faces radially inwardly. A second ring has an outer portion positioned within the circumferential groove and an inner portion projecting radially inwardly. The segments of the coupling are attached to one another by a plurality of adjustably tightenable fasteners. Tightening of the fasteners draws the segments toward one another and compresses the side portions radially inwardly.

The invention also includes a method of connecting first and second pipe elements in end to end relation. The method comprises:

(a) using a coupling having a plurality of segments attached in end to end relation surrounding a central space;
(b) supporting the segments in spaced apart relation on a seal positioned within the central space, the seal comprising a first ring formed of a flexible, resilient material, the first ring having first and second oppositely disposed side portions extending circumferentially, and a center portion positioned between and connecting the side portions to one another, each of the side portions having an outer diameter sized to support the segments in the spaced apart relation, the center portion having a diameter smaller than the diameters of the side portions;
(c) inserting the first and second pipe elements into the first ring from opposite sides of the seal;
(d) engaging the first and second pipe elements with a second ring having an outer portion positioned within a circumferential groove in the center portion of the first ring;
(e) drawing the segments toward one another; and
(f) compressing the first and second side portions between the segments and the pipe elements.

BRIEF DESCRIPTION OF THE DRAWINGS

FIG. 1 is an isometric view of a coupling having a seal according to the invention;
FIG. 2 is a cross sectional view taken at line 2-2 of FIG. 1;
FIG. 2A shows a portion from FIG. 2 on an enlarged scale.

DETAILED DESCRIPTION

Figure 3:
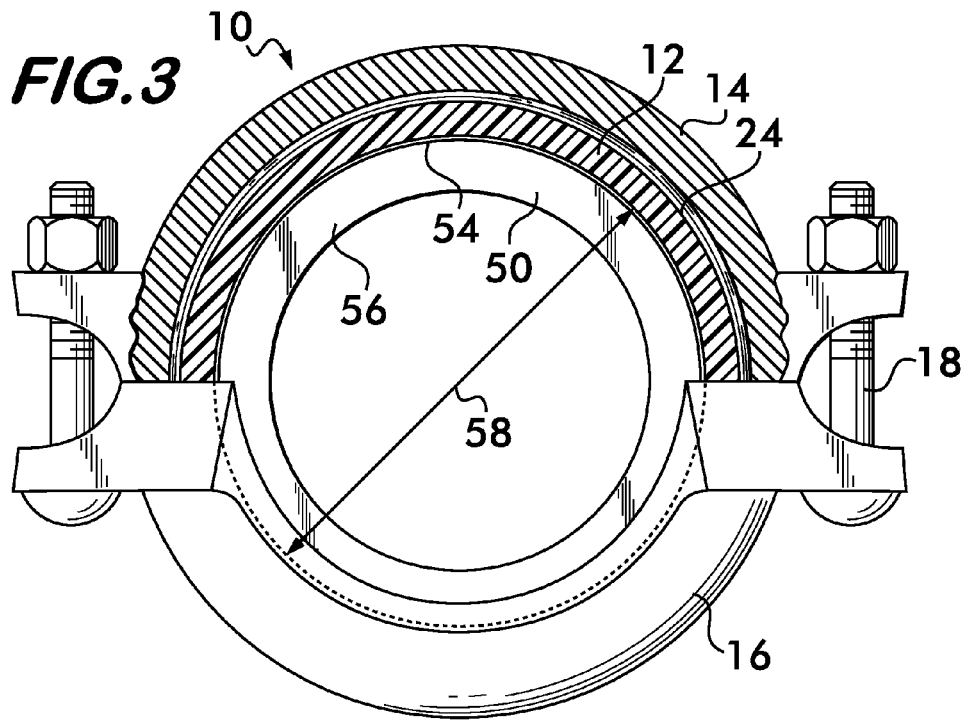
FIG. 3 is a partial sectional view of the coupling shown in FIG. 1.

FIG. 1 shows an isometric view of an installation ready coupling 10 having a seal 12 according to the invention. Coupling 10 comprises a pair of segments 14 and 16 attached to one another by adjustably tightenable fasteners 18 (nuts and bolts) in end to end relation surrounding a central space 20. Each segment 14 and 16 has arcuate surfaces 22, also known as keys, which project inwardly to engage the grooves or other outer surface portions of pipe elements inserted into the central space surrounded by the segments of the pipe coupling 10. As shown in FIG. 1, the segments 14 and 16 are supported on the seal 12 in spaced apart relation so as to accept pipe elements inserted into the central space without being disassembled as described below.

As shown in FIG. 2, seal 12 is formed of a first ring 24. The first ring has first and second side portions 26 and 28 which are oppositely disposed to one another. The side portions 26 and 28 extend circumferentially and are connected to one another by a center portion 30 which also extends circumferentially. In this embodiment the side portions are coaxial with the center portion. Each of the side portions has an outer diameter 32 which is greater than the outer diameter 34 of the center portion. The respective outer surfaces 26a and 28a of side portions 26 and 28 form outwardly facing surface portions which, in their undeformed shape, engage and support the coupling segments 14 and 16 in spaced apart relation. The center portion 30 has an outer surface 30a which is recessed radially inwardly relative to the outer surfaces 26a and 28a.

Each of the side portions 26 and 28 has a respective sealing surface 36 and 38 extending therefrom. The sealing surfaces 36 and 38 extend circumferentially and face radially inwardly so that they may engage and form a seal against the outer surfaces of the pipe elements when the joint is formed. It is advantageous to orient the surfaces angularly with respect to axis 40, perpendicular to the plane of the coupling. The angled surfaces act as a lead-in to guide the pipe elements into concentric alignment with the coupling upon insertion.

As shown in FIG. 2A, center portion 30 also includes a circumferential groove 42. Groove 42 faces radially inwardly and has a radially facing surface 44 which defines an inner diameter 46 of the groove 42 (see FIG. 2). It is advantageous that the groove 42 have a trapezoidal cross section 48, with its base formed by the surface 44. The trapezoidal cross sectional shape provides stress relief to the center portion 30.

Figure 4:
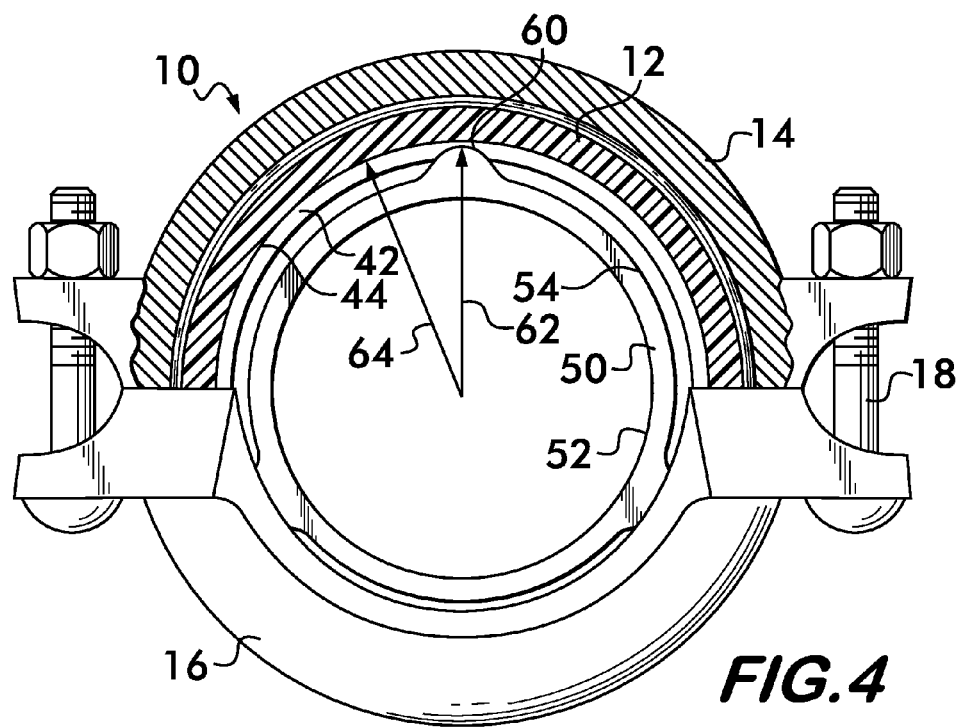
FIG. 4 is a partial sectional view of an alternate embodiment of the seal according to the invention.

Seal 12 also includes a second ring 50. Ring 50 may have a rectangular cross section 52 and has an outer portion 54 which is captured within the circumferential groove 42. Ring 50 also includes an inner portion 56 which projects radially inwardly to form a stop to control the depth of insertion of the pipe elements into the coupling. In one embodiment, shown in FIG. 3, ring 50 has a diameter 58 that is equal to or less than diameter 46 of the groove 42 in center portion 30. In another embodiment, shown in FIG. 4, ring 50 has a plurality of lobes 60 which project outwardly from the ring outer portion 54. In this embodiment the distance 62 from the center of ring 50 to the outermost point on any lobe is equal to or less than the distance 64 from the center of the first ring to the radially facing surface 44 of the groove 42. The advantage of these geometrical relationships are explained below. The lobed embodiment of ring 50 is easier to insert into the groove 42 because less surface area of the center portion 30 must be deformed to effect insertion as compared with the lobeless embodiment shown in FIG. 3. Alternately, the second ring 50 may be co-molded with the first ring as opposed to inserted within the groove after molding.

First ring 24 is made of a flexible, resilient material suitable for seals, such as EPDM, nitrile, perfluoroelastomers and silicone. Such materials permit the first ring 24 to deform when compressed by the segments 14 and 16 and form a fluid tight seal against the pipe elements connected by the coupling 10. Second ring 50 is formed of a rigid material, metals such as steel being advantageous because such materials will not be deformed if pinched by the ends of pipe elements when they are angularly deflected while connected by the coupling during a bending test or major seismic event.

Figure 5:
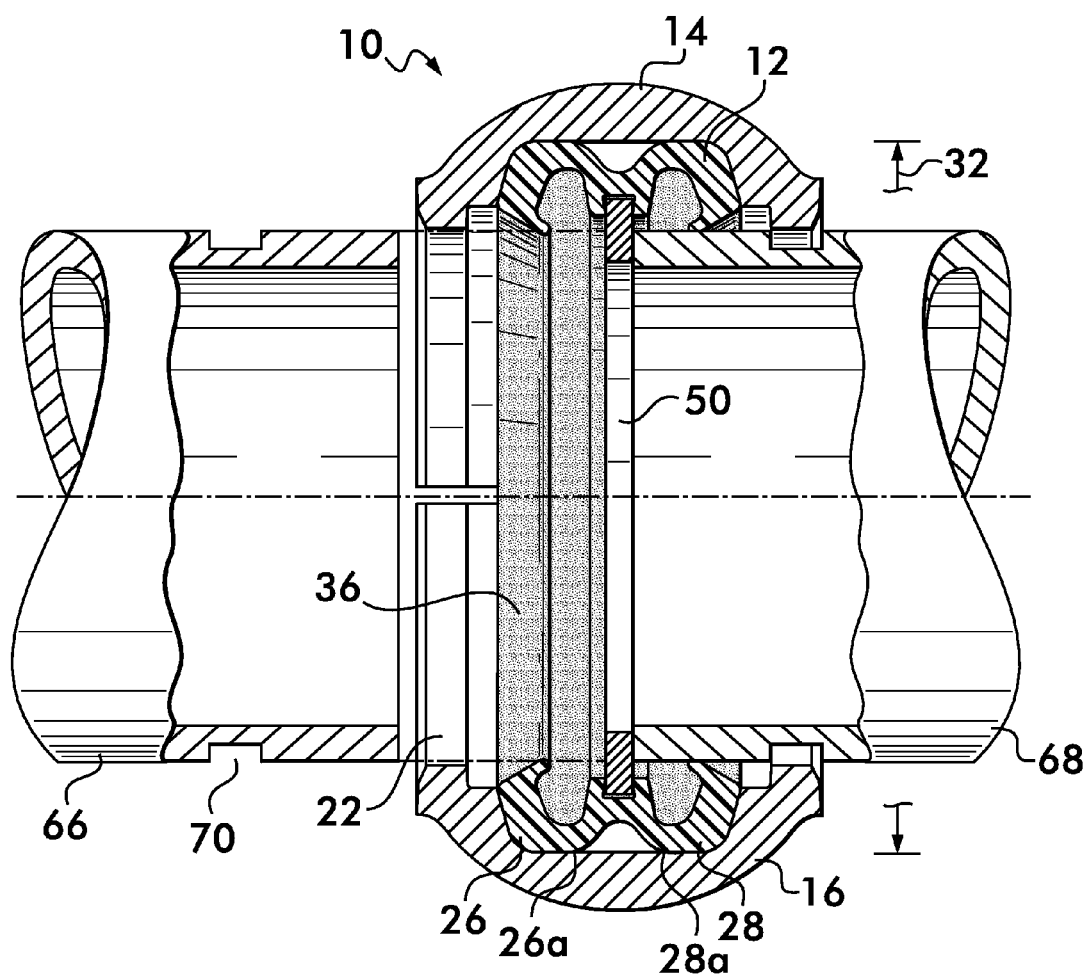
FIGS. 5-7 illustrate a method of joining pipe elements end to end using a coupling and seal according to the invention.
Figure 6:
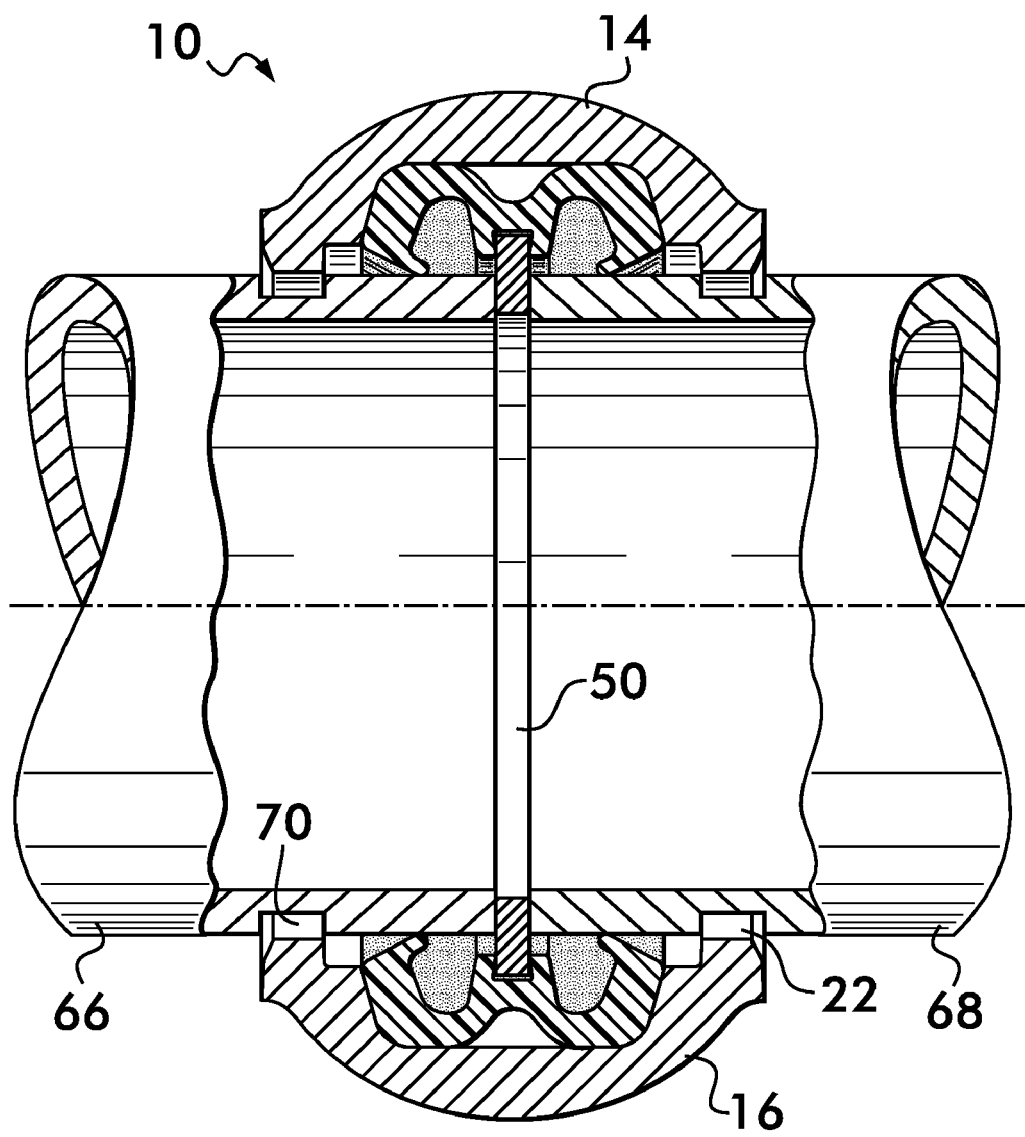
Figure 7:
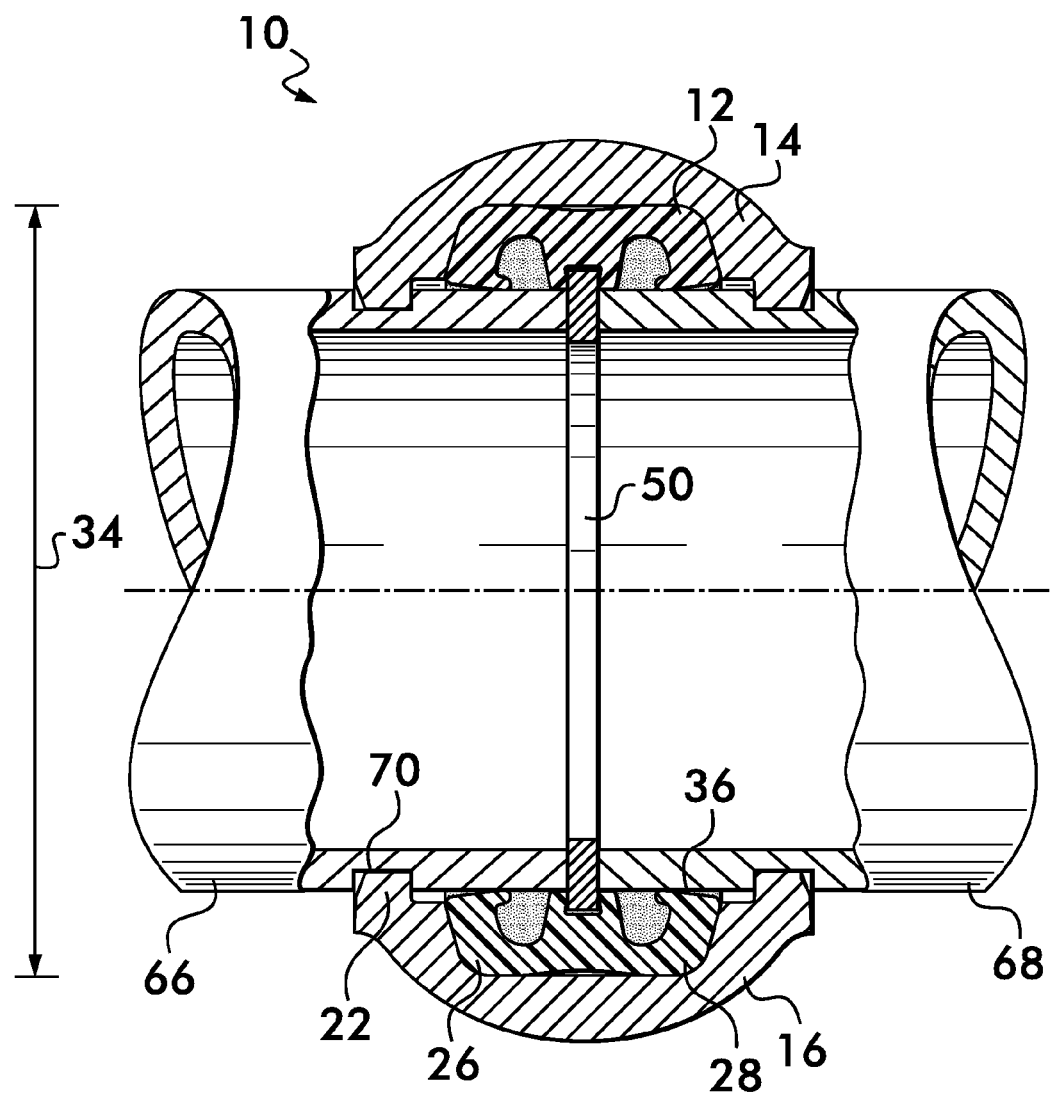

A method for connecting pipe elements 66 and 68 in end to end relation is illustrated in FIGS. 5, 6 and 7. As shown in FIG. 5, coupling segments 14 and 16 are supported in spaced apart relation on the respective outer surfaces 26a and 28a of side portions 26 and 28, which are substantially undeformed. The undeformed diameters 32 of the side portions 26 and 28 are such that the segments are spaced sufficiently to permit insertion of the pipe elements 66 and 68 as shown in FIG. 5. Insertion continues until contact is made between each pipe element and the stop ring 50 as shown in FIG. 6. Note that when the pipe elements 66 and 68 engage the stop ring 50 the arcuate surfaces 22 of the segments 14 and 16 align with circumferential grooves 70 in the pipe elements.

As shown in FIG. 7 the adjustably tightenable fasteners 18 (not shown, see FIG. 1) are tightened, drawing the segments 14 and 16 toward one another. The arcuate surfaces 22 are forced into engagement within the grooves 70, and contact between the segments and the seal 12 compresses the seal's side portions 26 and 28 thereby forcing the sealing surfaces 36 and 38 into engagement with the outer surfaces of pipe elements. The outer diameter 34 of the center portion 30 is established to be no greater than the desired final outer diameter of the seal in the deformed state which effects a fluid tight joint. The advantage of recessing the center portion is now clear, as it works in conjunction with the rigid stop ring 50 to allow the necessary deformation of the seal's side portions 26 and 28 to effect the fluid tight joint, but still permit a rigid stop ring to be used to prevent pinching deformation. To ensure that the stop ring does not inhibit the seal deformation it is advantageous that the ring 50 have a diameter 58 equal to or smaller than the diameter 46 of the groove 42 (see FIGS. 2 and 3). Similarly, the distance 62 from the center of ring 50 to the lobes 60 should be equal to or smaller than the distance 64 from the center of the ring 24 to the surface 44 of groove 42 (see FIG. 4).

What is claimed is:

1. A seal for a pipe coupling having a plurality of segments attached in end to end relation surrounding a central space, said seal being positionable within said central space and comprising:

a first ring formed of a flexible, resilient material, said first ring having first and second oppositely disposed side portions extending circumferentially, and a center portion positioned between and connecting said side portions to one another, each of said side portions having an outer diameter greater than the outer diameter of said center portion;

a circumferential groove positioned within said center portion and facing radially inwardly;

a first sealing surface positioned on said first side portion and facing radially inwardly;

a first pressure channel positioned between said first side portion and said circumferential groove;

a first pressure actuated surface positioned on said first side portion opposite to said first sealing surface and facing said first pressure channel;

a second sealing surface positioned on said second side portion and facing radially inwardly;

a second pressure channel positioned between said second side portion and said circumferential groove;

a second pressure actuated surface positioned on said second side portion opposite to said second sealing surface and facing said second pressure channel;

a second ring having an outer portion positioned within said circumferential groove and an inner portion projecting radially inwardly, said second ring having an outer diameter less than an inner diameter of said circumferential groove so as to leave a gap between said first and second rings within said circumferential groove.

2. The seal according to claim 1, wherein said circumferential groove has a trapezoidal cross sectional shape.

3. The seal according to claim 2, wherein said second ring has a rectangular cross sectional shape.

4. The seal according to claim 1, wherein said first ring is formed of an elastic material selected from the group consisting of EPDM, nitrile, perfluoroelastomers and silicone.

5. The seal according to claim 1, wherein said second ring is formed of a rigid material.

6. The seal according to claim 1, wherein said second ring is formed of metal.

7. The seal according to claim 1, wherein said second ring has a plurality of lobes projecting radially outwardly from said outer portion.

8. The seal according to claim 7, wherein the distance from the center of said second ring to an outermost point on said lobes is less than the distance from the center of said first ring to a radially facing surface within said groove.

9. The seal according to claim 1, wherein each of said first and second side surfaces are angularly oriented with respect to an axis oriented perpendicular to a plane containing said first ring.

10. The seal according to claim 1, wherein said first and second side portions are arranged coaxially with said center portion.

11. A coupling for connecting pipe elements in end to end relation, said coupling comprising:

a plurality of segments attached to one another in end to end relation surrounding a central space, said segments being positioned in spaced apart relation relatively to one another;

a seal positioned within said central space, said seal comprising:

a first ring formed of a flexible, resilient material, said first ring having first and second oppositely disposed side portions extending circumferentially, and a center portion positioned between and connecting said side portions to one another, each of said side portions having an outer diameter sized to support said segments in said spaced apart relation, said center portion having an outer diameter smaller than said outer diameters of said side portions;

a circumferential groove positioned within said center portion and facing radially inwardly;

a first sealing surface positioned on said first side portion and facing radially inwardly;

a first pressure channel positioned between said first side portion and said circumferential groove;

a first pressure actuated surface positioned on said first side portion opposite to said first sealing surface and facing said first pressure channel;

a second sealing surface positioned on said second side portion and facing radially inwardly;

a second pressure channel positioned between said second side portion and said circumferential groove;

a second pressure actuated surface positioned on said second side portion opposite to said second sealing surface and facing said second pressure channel;

a second ring having an outer portion positioned within said circumferential groove and an inner portion projecting radially inwardly, said second ring having an outer diameter less than an inner diameter of said circumferential groove so as to leave a gap between said first and second rings within said circumferential groove;

a plurality of adjustably tightenable fasteners for attaching said segments end to end, tightening of said fasteners drawing said segments toward one another and compressing said side portions radially inwardly.

12. The coupling according to claim 11, wherein said circumferential groove has a trapezoidal cross sectional shape.

13. The coupling according to claim 12, wherein said second ring has a rectangular cross sectional shape.

14. The coupling according to claim 11, wherein said first ring is formed of an elastic material selected from the group consisting of EPDM, nitrile, perfluoroelastomers, and silicone.

15. The coupling according to claim 11, wherein said second ring is formed of a rigid material.

16. The coupling according to claim 11, wherein said second ring is formed of metal.

17. The coupling according to claim 11, wherein said second ring has a plurality of lobes projecting radially outwardly from said outer portion.

18. The coupling according to claim 17, wherein the distance from the center of said second ring to an outermost point on said lobes less than the distance from the center of said first ring to radially facing surface within said groove.

19. The coupling according to claim 11, wherein each of said first and second side surfaces are angularly oriented with respect to an axis oriented perpendicular to a plane containing said first ring.

20. The seal according to claim 11, wherein said first and second side portions are arranged coaxially with said center portion.

* * * * *

UNITED STATES PATENT AND TRADEMARK OFFICE
CERTIFICATE OF CORRECTION

PATENT NO.       : 8,038,176 B2                                     Page 1 of 1
APPLICATION NO.  : 12/539330
DATED            : October 18, 2011
INVENTOR(S)      : Matthew A. Bowman et al.

It is certified that error appears in the above-identified patent and that said Letters Patent is hereby corrected as shown below:

Claim 18, column 7, line 8, add word "is" after words "on said lobes"

Claim 18, column 7, line 9, add word "a" after words "ring to"

Signed and Sealed this

Sixth Day of December, 2011

David J. Kappos
*Director of the United States Patent and Trademark Office*